Feb. 27, 1968  F. W. KNAPP  3,370,571
METHOD OF AND APPARATUS FOR PRODUCING AND DISPENSING
AN INSECTICIDE LIQUID
Filed May 25, 1966
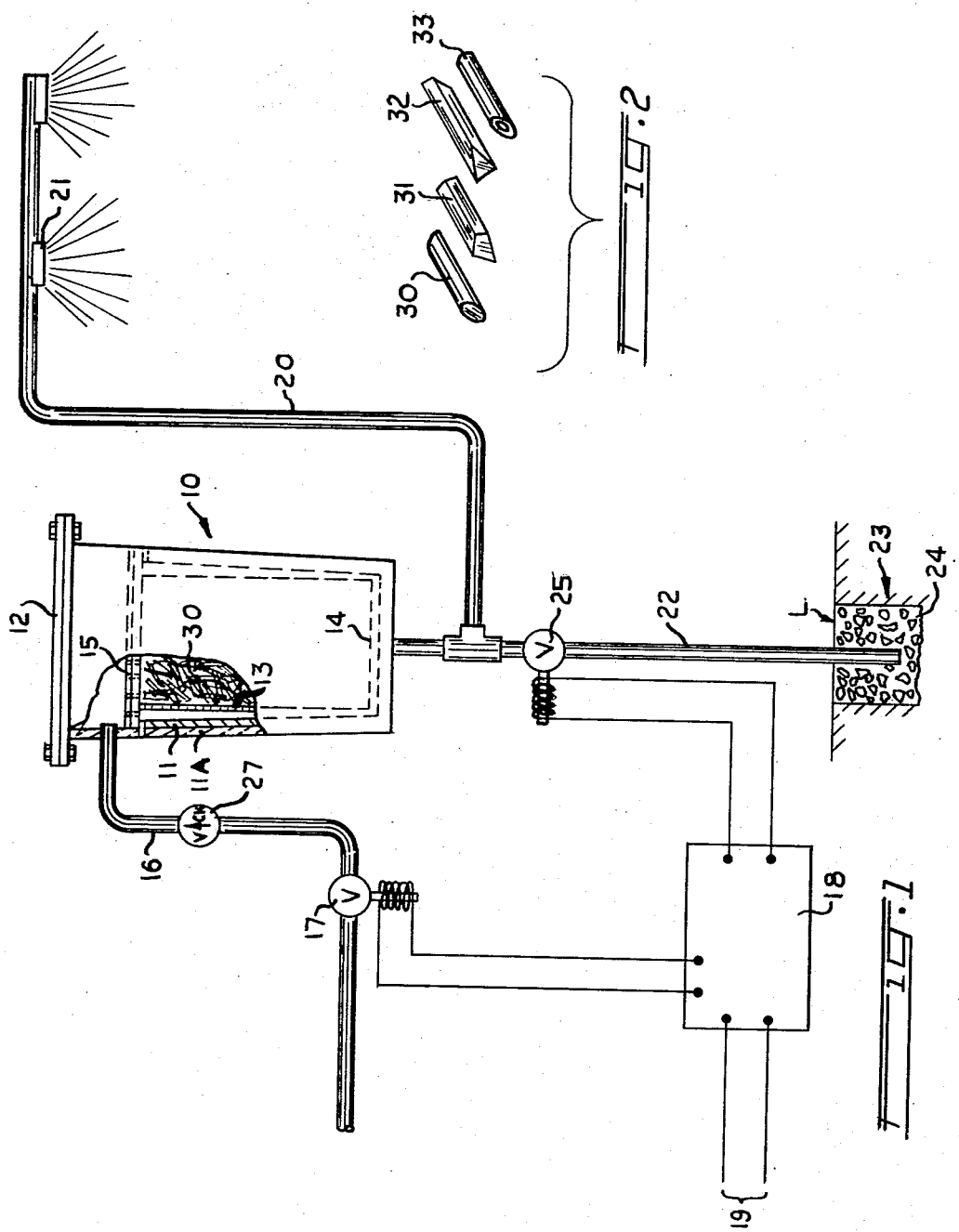
INVENTOR
FRED W. KNAPP
BY  W. E. Sherwood
ATTORNEY

United States Patent Office 3,370,571
Patented Feb. 27, 1968

3,370,571
METHOD OF AND APPARATUS FOR PRODUCING AND DISPENSING AN INSECTICIDE LIQUID
Fred W. Knapp, Lexington, Ky., assignor, by mesne assignments, to The University of Kentucky Research Foundation, Lexington, Ky., a corporation of Kentucky
Filed May 25, 1966, Ser. No. 552,928
6 Claims. (Cl. 119—159)

This invention relates generally to the controlling of insect populations and more particularly to an improved method and apparatus for producing an insecticide liquid and to the dispensing of such liquid.

In its broader aspects the invention may be practiced using many varieties of active insecticide ingredients but for purpose of disclosure and not of limitation, it is disclosed herein as applicable to the use of the insecticide compound; 2,2-dichloro vinyl dimethyl phosphate. This compound has a high insecticidal activity both by contact and by vapor action and its volatility and chemical properties are such as to result in a short residual action. For example, the rate of volatilization is such that up to 5% of the total dose applied, to an inert surface, may be in the air within an hour after application.

The material is especially effective in livestock pest control and can be obtained commercially as an emulsible concentrate, as a 0.5% spray solution, as a 0.5–1.0% fogging solution for use in enclosures, as a 20% flat resin strip, or as a dust. When employed according to proper directions it will quickly control the populations of such pests as house flies, stable flies, horn flies, face flies, mosquitoes or the like. However, relatively precise concentrations of the material should be employed and at the same time it is recommended that human contact with any of the physical forms of the agent should be avoided as far as possible. In general, the safe threshold level for inhaling of the materials by humans appears to be not more than about one microgram per liter of air. Such factors accordingly add to the time, labor and expense of employing the material in the aforementioned commercially available forms. Moreover, care should be exercised insofar as the treatment of animals is concerned and, for example, when a dairy cow is involved in a fly-control program, not more than two fluid ounces of a 1% solution of the material per day should be applied to the animal as a spray which lightly moistens its hair.

I now have discovered that by employing the insecticide agent in a modified form in accordance with the following disclosure, an effective insect control program can be carried out economically and safely over an extended period of days. In accordance with the invention a confined body of discrete pieces of plastic material in form-retaining shape and with the active insecticide agent dispersed in the plastic, is provided. Then, depending upon the dynamics of the insect population to be controlled, water is passed, in the quantity and at the appropriate times as needed, through the body of material to form an insecticide liquid which is dispensed in the form of a fine spray.

The spray of insecticide liquid serves to kill insects, such as flies, as a result of one or more effects. For example, vaporization of the insecticide, or oral drinking of liquid by the insect, or topical application to the body of the insect as it moves through the spray, all act as effective ways of killing the pest. The total amount of insecticide to be dispensed per day at the beginning of a control program preferably should be greater than the amount dispensed per day at the end of such program, since at the start of the program insects of varied maturity may be involved, such as insects in the flying stage, pupa stage, reproducing stage, and the like. Moreover, when the application of the spray to an area, rather than to an animal, is desired, a continuous of the spray for several minutes is useful, since the spray moisture attracts the insects. As insects fly back and forth through the spray an effective topical application will result.

It is an object of the invention to provide an improved method for producing and dispensing an insecticide liquid as required, and which reduces the amount of contact required of the operator with respect to the insecticide material.

Another object is to provide an improved method for employing a given amount of insecticide material over an extended period of time and to reduce the cost of operation.

Another object is to provide an improved apparatus for automatically producing and dispensing an insecticide liquid.

Other objects and advantages of the invention will become more apparent as the description proceeds and when considered in conjunction with the accompanying drawings in which FIG. 1 is a diagrammatic view with portions of the container cut away and showing a preferred arrangement of equipment for carrying out the method; and FIG. 2 is a view showing in perspective suitable forms of solid shapes in which the insecticide agent may be embodied.

In accordance with the invention a potent insecticide material which, for example, may comprise a material of the type disclosed in the Whetstone and Harmon Patent No. 2,956,073 and available from Shell Chemical Company under the trademark, Vapona, is provided in admixture with a plastic material and in a solid non-planar form which possesses a substantial ratio of surface to volume. Preferably, the ratio of insecticide to plastic by weight is about 5% to 20%. Various resins of the types disclosed in Gerolt Patent No. 2,966,440 may be employed in forming a homogeneous molten mixture with the insecticide and which mixture upon cooling may be extruded in rod form and cut into short lengths thus to make available a body of material which can be deposited in a container in random fashion with many interstices throughout the body of such material.

Referring now to FIG. 1, one form of apparatus is shown for carrying out the invention as applied to the control of insects in animal husbandry practices and while utilizing the above-described insecticide material. A tank 10 of suitable capacity having a wall 11 of a material impervious to the chemical action of the insecticide and covered with an outer jacket 11A of heat-insulating material, is equipped with a removable heat-insulated cover 12. Closely fitting within the tank is a container having foraminous side walls 13, bottom 14, and cover 15. This container is adapted to function as an expendible cartridge of insecticide material and, when spent, will be removed from the tank and suitably disposed of in a safe manner, as by burial in the ground.

Connected to the tank is a first conduit 16 leading to a source of water under a substantially constant pressure and having a first valve 17 controlling the flow of water to the tank. This valve preferably is a conventional solenoid operated valve, spring-loaded to normally closed position, and adapted to be opened by a timer 18 connected to an electrical supply 19 and which timer conveniently may be of the type represented by Paragon model 8015-0 available from Paragon Electric Co., Two Rivers, Wisconsin. For purposes of illustration, in carrying out the preferred methods of generating and spraying the insecticide liquid efficiently on a summer day, the timer may be set to open valve 17 for a ten-minute interval at 8:00 a.m., at noon, and at 4:00 p.m., and to permit the valve to remain closed during the remainder of a 24-hour period. Upon opening the valve 17, a uniform rate of flow through the system normally is desired and thus during the entire spray period the valve preferably is held open to a uniform extent. It will be understood that other time intervals and other lengths of time for accomplishing the spraying may be employed merely by adjusting the setting of the timer, and without departing from the invention.

Connected to the tank is a second conduit 20 leading to one or more conventional nozzles 21 located at a suitable elevation from which livestock standing on the ground or on a concrete or wooden floor may receive a fine spray of the liquid insecticide. When the animal is not present, the spray, of course, falls on such floor and vaporizes, thus to form a lethal environment for insects in that region beneath the nozzles. Moreover, the insects attracted by the spray may acquire a lethal dose by topical application, or may drink liquid accumulating on the floor. Also connected to the tank is a drain conduit 22 which preferably discharges into a disposal sump 23, located beneath the ground level L. This sump may include gravel or stone 24 serving to aid in percolating the liquid into the ground. A second valve 25 preferably similar to valve 17, is located in the drain conduit and likewise is under control of timer 18. A check valve 27 preferably is interposed in conduit 16 to prevent back flow of liquids containing insecticide from reaching the water supply. The timer control permits valve 25 to open only when valve 17 is closed and valve 17 to open only when valve 25 is closed. Moreover, valve 17, when open, will remain open for the entire time of a spraying period whereas valve 25 is required to remain open only long enough to effect the complete draining of tank 10 and its attached conduits.

As illustrated in FIG. 2 the material to be placed in the container which is to serve as the replaceable cartridge in the tank will be in a suitable solid form such that adjacent discrete particles or pieces will not remain adhered to each other. In this way the shape of the material does not detract from the scouring action of the water as it passes through the tank. It appears that molecules of the active insecticide agent migrate to the exposed surface of the plastic particle and then are carried off by the water on its journey to the spray nozzles. When the material is extruded in the form of a cylindrical rod 30 and later cut with its ends on a slant, for example, having a diameter of about 3 mm. and a length of about 4 mm., the water efficiently contacts the piece as it passes through the tank and rapidly scours the insecticide molecules from the surfaces of those rod pieces. Also the rods do not plaster against each other, thus permitting water to drain rapidly into the sump when valve 25 opens. The plastic material of the rods is sufficiently insoluble in water to enable the material to retain its form throughout the entire period of use of the charge of material in the container. A rod 31 having a square cross-section, or a rod 32 with a triangular cross-section, or a rod 33 of tubular cross-section, or even other rod shapes having a substantial ratio of surface to volume may be employed. Flat strips of material which may lie flush with each other, or finely divided material such as a dust, however, are generally unsatisfactory.

*Example*

One pound of material in the form of short cylindrical rod sections about 3 mm. in diameter and 4 mm. in length comprising a mixture of plastic and insecticide and containing 20% by weight of 2,2-dichlorovinyl dimethyl phosphate was enclosed in random fashion within a heat-insulated tank. A total volume of 6 liters of fresh water at a pressure head of 20 p.s.i. and a temperature of 60° F. was continuously forced in contact therewith and was dispensed in a fine spray for a total of ten minutes of uninterrupted spraying Three such sprayings each day for a total of 60 consecutive days and occurring at 8:00 a.m.; at noon; and at 4:00 p.m. each day were effected by means of a timing mechanism and water was promptly drained from contact with the material after each spraying was concluded.

The effectiveness of the spray, as determined by laboratory bioassay with brine shrimp and with house flies, is shown the following table:

TABLE

| Day of use of material | Concentration of insecticide in spray as parts per million— | |
|---|---|---|
| | At end of first minute of spray period | At end of each of the second to tenth minutes of spray period |
| 1 | 270.0 | 54.0 |
| 30 | 8.8 | [1] 10.6 |
| 60 | 1.7 | [1] .3 |

[1] Under laboratory conditions the 1.6 concentration is sufficient to cose a 100% kill of three day old house flies when consumed orally. At the 0.3 concentration the kill of such flies is about 45%.

Again referring to FIG. 1, as water enters tank 10 at the beginning of a spray period it appears that the material 30, whose surface is then rich in molecules of insecticide can rapidly transfer those molecules to the water. It has been found that during the first minute of a ten-minute spray period about 35% of the insecticide transferred to the water for the entire ten-minute period will be dispensed. The scouring action of the incoming water rapidly carries off the richer coating of insecticide molecules and in each of the second and succeeding minutes of a spray period the concentration of insecticide is not more than one fourth the concentration found during the first minute of the spray period.

This, however, is advantageous in helping to preserve the useful life of the charge of material and at the same time permits a sufficiently rapid evolution of insecticide molecules during the second and succeeding minutes of operation to produce an effective total amount of insecticide in the spray in the course of a reasonably long spray period. Although a ten-minute spray period has been illustrated, longer or shorter periods may be employed depending upon the particular situation encountered in the insect control program.

Moreover, it has been found that the temperature under which the contact of water and plastic-insecticide particles occurs should not exceed 100° F. if a given charge of material is to be used efficiently over a maximum period of time. The water supplied to the tank, therefore, should be below that temperature and if the tank is exposed to a summer sun, the insulation should be capable of preventing the tank interior from reaching 100° F.

Under appropriate conditions a single charge of material may be effective for 70 days or longer with the result that in certain sections of the country where insects are a problem only in warm weather, the insect control program would require a maximum of only two charges in a year.

Various modifications of the apparatus and method may be employed without departing from the broader aspects of the invention. For example, when maximum useful life of the charge of material is not a dominant factor, an apparatus in which the animal itself serves to initiate and to control the flow of insecticide liquid, may be employed.

Having thus described the invention, it will be apparent that various changes and modifications can be made, and it is intended to cover in the appended claims such changes and modifications as fall within the true spirit and scope of the invention.

What is claimed is:

1. In a method for controlling insects by an insecticide, the improvement comprising, providing a confined body of discrete pieces of plastic material in form-retaining shape with an insecticide agent dispersed therein, generating an insecticide liquid, as required, by passing water in contact with said material thereby to remove said agent from the surfaces of said pieces and to form said insecticide liquid, and dispensing said liquid into a region in which control of insects is desired.

2. The method of controlling insects comprising, providing a confined body of plastic material in form-retaining shape with an insecticide dispersed therein, periodically passing water under pressure into contact with the surface of said material during a timed cycle of operation thereby to remove the insecticide therefrom and to form an insecticide spray liquid in which the concentration of insecticide provided during the first minute of spraying will be at least four times the concentration provided for each minute of the remainder of the cycle of spraying, spraying the liquid for a predetermined period of time into a region to be treated for insect control, interrupting the supply of water to said material between successive cycles of spraying, and immediately draining previously supplied water from contact with said material after each interruption thereby to aid in conserving the potency of said material for use in subsequent cycles of spraying.

3. The method as defined in claim 1 wherein said material and said water are at a temperature of not more than about 100° F.

4. The method as defined in claim 2 wherein said material is provided in the form of discrete non-planar pieces arranged in random fashion in contact with adjacent pieces and adapted to insure contact of water with substantially all of the exposed surface of each piece.

5. An animal insecticide dispenser for use in controlling insects on an animal comprising in combination a tank having a first conduit for delivering fresh water thereto, a second conduit connected to said tank for removal of insecticide liquid from said tank, and a drain conduit for draining said liquid from said tank and from said second conduit; means connected to said second conduit for dispensing said liquid upon said animal wherein control of insects is desired, a foraminous walled container removably supported in said tank and adapted to contain a charge of insecticide generating material, a cover removably attached to said tank for permitting insertion and removal of said container, a first valve controlling flow in said first conduit, a second valve controlling flow in said drain conduit, and timer means for actuating said valves in a timed cycle wherein said second valve is opened to drain liquid from said tank only when said first valve is closed and said first valve is opened to supply water to said tank only when said valve is closed.

6. Apparatus as defined in claim 5 wherein said tank includes heat-insulating means adapted to prevent excessive temperature within said tank when exposed to the sun.

References Cited
UNITED STATES PATENTS

| | | | |
|---|---|---|---|
| 870,270 | 11/1907 | Brown | 43—132 |
| 2,238,872 | 4/1941 | Mather | 119—159 |
| 2,684,658 | 7/1954 | Richardson et al. | 119—159 |
| 3,003,518 | 10/1961 | Tisdale | 239—315 X |
| 3,108,574 | 10/1963 | Albers | 119—159 |
| 3,145,087 | 8/1964 | Walker | 239—310 |
| 3,165,114 | 1/1965 | Garrett | 239—317 X |
| 3,173,402 | 3/1965 | Cassel | 119—159 |
| 3,183,890 | 5/1965 | Albers | 119—159 |
| 3,191,868 | 6/1965 | Brown et al. | 239—315 |

ALDRICH F. MEDBERY, *Primary Examiner.*